(12) United States Patent
Kobayashi

(10) Patent No.: US 12,086,614 B2
(45) Date of Patent: Sep. 10, 2024

(54) SYSTEM REPLICATION METHOD IN HYBRID CLOUD ENVIRONMENT

(71) Applicant: Hitachi, Ltd., Tokyo (JP)

(72) Inventor: Miho Kobayashi, San Jose, CA (US)

(73) Assignee: HITACHI, LTD., Tokyo (JP)

(*) Notice: Subject to any disclaimer, the term of this patent is extended or adjusted under 35 U.S.C. 154(b) by 437 days.

(21) Appl. No.: 17/509,588

(22) Filed: Oct. 25, 2021

(65) Prior Publication Data
US 2023/0129754 A1 Apr. 27, 2023

(51) Int. Cl.
G06F 9/455 (2018.01)
G06F 9/445 (2018.01)

(52) U.S. Cl.
CPC ...... *G06F 9/44552* (2013.01); *G06F 9/45558* (2013.01); *G06F 2009/45562* (2013.01)

(58) Field of Classification Search
CPC ............ G06F 9/44552; G06F 9/45558; G06F 2009/45562
See application file for complete search history.

(56) References Cited

U.S. PATENT DOCUMENTS 7,152,078 B2 12/2006 Yamagami
2017/0097776 A1 4/2017 Vasilyev et al.

*Primary Examiner* — Gregory A Kessler
(74) *Attorney, Agent, or Firm* — Procopio, Cory, Hargreaves & Savitch LLP

(57) ABSTRACT

Example implementations described herein include an innovative method for copying a first virtual machine accessing a primary volume in a hybrid cloud environment, the copy of the first virtual machine accessing a secondary volume in the hybrid cloud environment. The method may include creating the secondary volume. The method may further include creating an image of the first virtual machine and launching, from the image, the copy of the first virtual machine by (1) disabling a set of connection ports for connecting to the primary volume, (2) updating the set of connection ports for connecting to the secondary volume, and (3) enabling the set of connection ports.

20 Claims, 9 Drawing Sheets

SYSTEM REPLICATION METHOD IN HYBRID CLOUD ENVIRONMENT

BACKGROUND

Field

The present disclosure is generally directed to creating a copy of an analysis environment (e.g., virtual machine and an associated storage volume) such that the copied analysis environment does not interfere with an original analysis environment.

Related Art

The demand for Information Technology (IT) infrastructure flexibility is increasing the number of companies using public clouds. On the other hand, the companies have sensitive data which they keep in their own data centers. Therefore, one of the popular IT environments is using a mix of on-premises and public cloud, which is called a hybrid cloud. Some companies want to use modern applications/compute services provided by public cloud vendors. In some aspects, a hybrid cloud architecture may include a storage system volume set up in a physical data center attached to a virtual machine (VM) created in a public cloud. Some users use a colocation service (purchasing storage system areas or machines to use (a pay-as-you-go payment system)) as a private cloud in a physical data center to set up this system architecture. This service is provided by a service provider and a storage system vendor. Using this system architecture may cut down the cost of managing enterprise data centers and using storage systems easily and flexibly, like a public cloud service. Usually, a co-located data center is near to a public cloud datacenter physically and connects to it with high speed network. Co-located data centers allow maintaining data security in an enterprise (on-premises) data center while providing VMs in a co-located public cloud data center access to the data via the high-speed network connection.

One hybrid cloud use case is data analysis. Users may want to analyze many patterns, therefore utilizing data is important. In some instances, a user may make a request to copy an existing analysis environment to a new environment for an additional analysis or test. This copying may prevent the additional analysis or test from crashing existing ones. To do this, it's important for users to copy a whole system in one step without the need to be aware of a platform architecture and a data location. Accordingly, there may be a benefit to a system, method, or apparatus that can generate a copy of a VM and a copy of an existing storage volume that (1) avoids accessing the existing storage volume data from the copied VM and (2) switches an access from the existing storage volume (configured in the VM to be copied) to the new copied storage volume.

One challenge addressed by the system, method, and apparatus below, is that currently, when establishing a copy of a new environment, a VM image is copied/created along with a related storage volume. The copied VM image will be configured to connect to a same storage volume as the VM from which it is copied. Accordingly, an administrator must and attach the new VM to the copied storage volume by updating a connection setup file related to storage volumes included in the VM.

SUMMARY

Example implementations described herein include an innovative method for copying a first virtual machine accessing a primary volume in a hybrid cloud environment, the copy of the first virtual machine accessing a secondary volume in the hybrid cloud environment. The method may include creating the secondary volume. The method may further include creating an image of the first virtual machine and launching, from the image, the copy of the first virtual machine by (1) disabling a set of connection ports for connecting to the primary volume, (2) updating the set of connection ports for connecting to the secondary volume, and (3) enabling the set of connection ports.

Example implementations described herein include an innovative computer-readable medium storing computer executable code for copying a first virtual machine accessing a primary volume in a hybrid cloud environment, the copy of the first virtual machine accessing a secondary volume in the hybrid cloud environment, the code when executed by a processor causes the processor to create the secondary volume. The code when executed by the processor may further cause the processor to create an image of the first virtual machine and launch, from the image, the copy of the first virtual machine by (1) disabling a set of connection ports for connecting to the primary volume, (2) updating the set of connection ports for connecting to the secondary volume, and (3) enabling the set of connection ports.

Example implementations described herein include an innovative management server for copying a first virtual machine accessing a primary volume in a hybrid cloud environment, the copy of the first virtual machine accessing a secondary volume in the hybrid cloud environment, the management server including: a computer-readable medium storing computer executable code and a processor. The processor may execute the code to create the secondary volume. The processor may also execute the code to create an image of the first virtual machine and to launch, from the image, the copy of the first virtual machine by (1) disabling a set of connection ports for connecting to the primary volume and (2) updating the set of connection ports for connecting to the secondary volume, and (3) enabling the set of connection ports.

Example implementations described herein include an innovative system for copying a first virtual machine accessing a primary volume in a hybrid cloud environment, the copy of the first virtual machine accessing a secondary volume in the hybrid cloud environment. The system may include means for creating the secondary volume. The system may further include means for creating an image of the first virtual machine and means for launching, from the image, the copy of the first virtual machine by (1) disabling a set of connection ports for connecting to the primary volume, (2) updating the set of connection ports for connecting to the secondary volume, and (3) enabling the set of connection ports.

DETAILED DESCRIPTION

Figure 1:
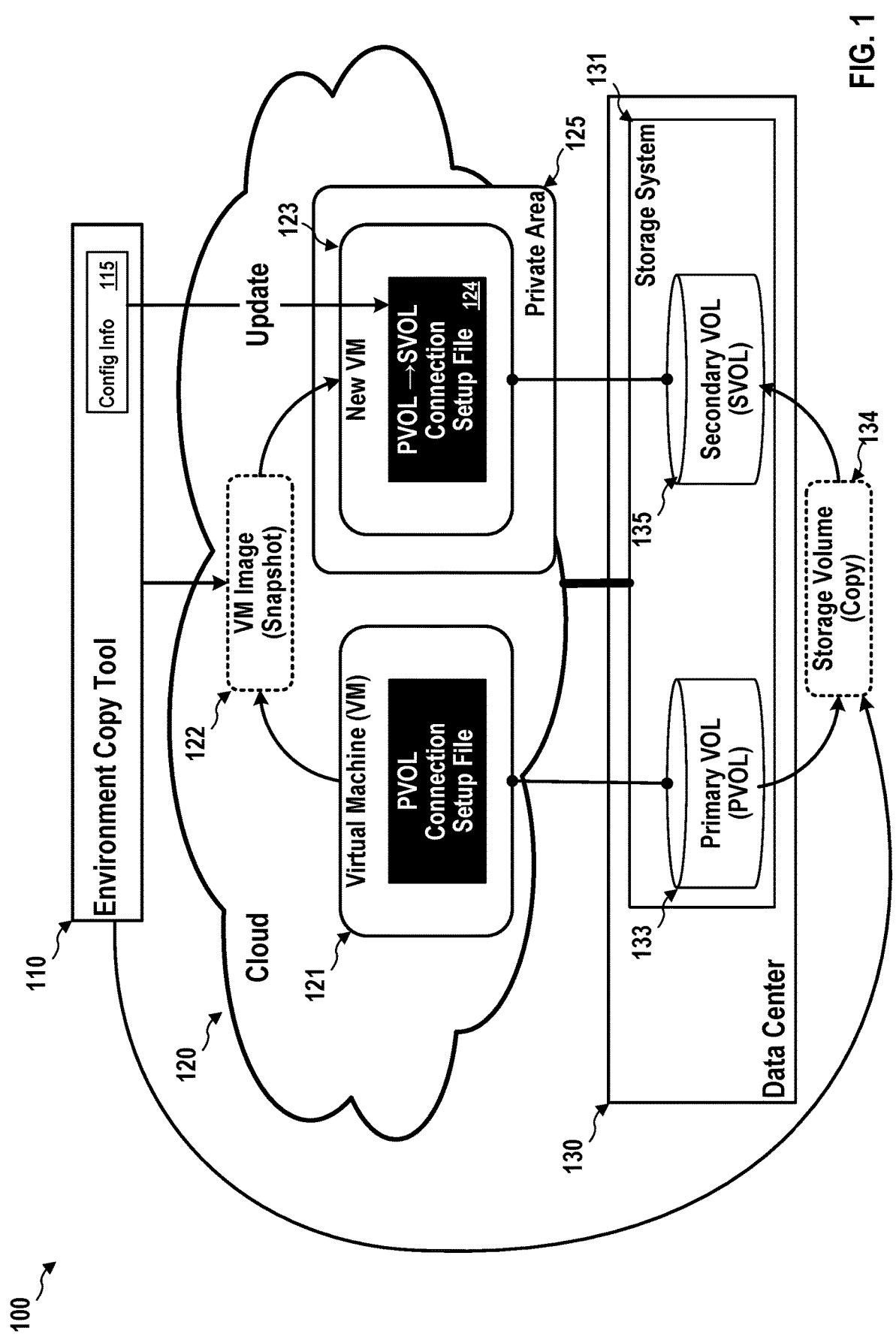
FIG. 1 is a diagram of an example computing environment in which the invention may be used.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein relate to an innovative Environment Copy Tool, a method performed by the Environment Copy Tool, a computer-readable medium computer executable code for implementing the Environment Copy Tool, and a system including the Environment Copy Tool. The Environment Copy Tool may copy a VM image and the storage volume (e.g., to generate a secondary volume (SVOL)), create the new VM based on the image with no open connection ports, launch the new VM, update the connection setup file and the open port policy, and establish the connection between new VM and SVOL. The Environment Copy Tool may be deployed in hybrid cloud environments, which may allow a user to create/launch a new VM in a private area, update the connection setup file, and establish a connection between the new VM and SVOL. While embodiments, or aspects, of the invention may be described in connection with a user establishing an IT system with both cloud data centers and physical data centers, the invention is similarly applicable to an on-premises system, a cloud system, or other combination systems (e.g., a public cloud and a traditional on-premises data center, a colocation service and an on-premises data center, etc.) and so on. A user (e.g., a system administrator) may be provided with a dashboard to create a copy policy and monitor the state/progress of a copy procedure.

While embodiments, or aspects, of the invention may be described in connection with data analytics, in some aspects, the invention may be used in relation to adding/deleting necessary platform resources in a timely manner when the data process load temporarily increases. For instance, you can apply this to credit card payment processing to minimize IT costs and prevent processing delays. In some aspects, the invention may be used in relation to disaster recovery. For example, a data backup (e.g., in a SVOL) may be stored at a secondary site such that if a primary site used for normal business goes down and the primary data (e.g., in a PVOL) becomes inaccessible, a user can access the SVOL on the secondary site.

FIG. 1 is a diagram 100 of an example computing environment in which the invention may be used. Diagram 100 illustrates an Environment Copy Tool 110 launch (or instructing the cloud 120 to launch) a new VM 123 including an updated connection setup file 124 in a private network area 125 based on a VM image 122 of a first VM 121 in a cloud 120 (e.g., a public cloud). The private network area 125 may be based on a private subnet (e.g., set of internet protocol (IP) addresses) or other network segmentation operations that does not allow the new VM 123 to connect to the primary volume (PVOL) 133. The Environment Copy Tool 110, in some aspects, also includes configuration information 115 that is used to update a set of connection parameters for the new VM 123 to allow the new VM 123 to connect to a secondary storage volume (SVOL) 135. The SVOL 135 may also be created (copied) from PVOL 133 based on a direction/instruction from the Environment Copy Tool 110. The SVOL 135 may be based on a copy 134 of the PVOL 133. Both the PVOL 133 and the SVOL 135 may be hosted/stored in a storage system 131 of a data center 130 (e.g., an on-premises data center). In some aspects, an administrator may provide a network policy (e.g., implemented by the configuration information 115) to connect to the SVOL 135 after updating the connection setup file. There may be many ways to create a private area, for instance using a private subnet, using a private network, closing the specific ports for connections, etc.

Figure 2:
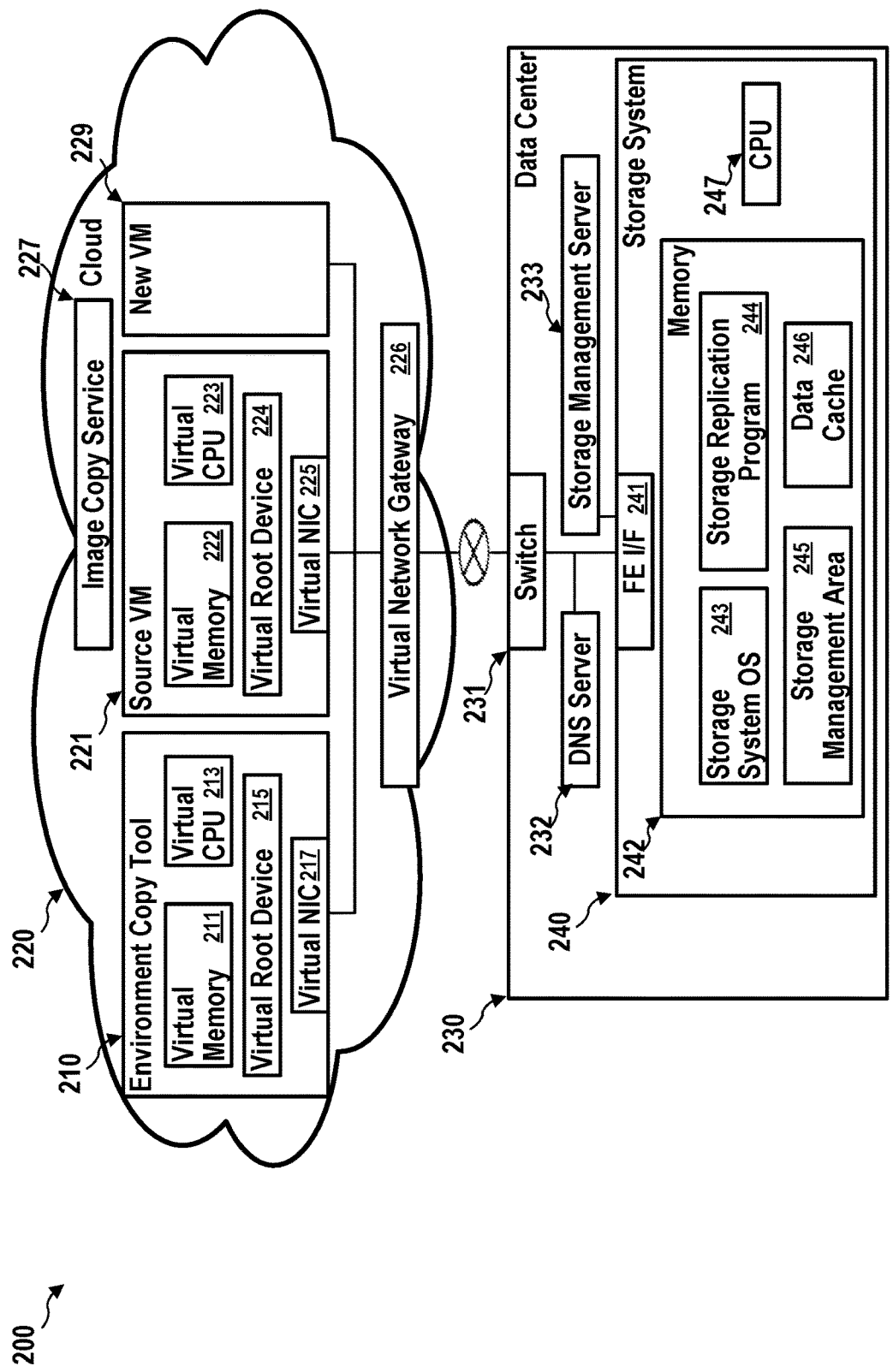
FIG. 2 is a more detailed diagram of a logical configuration of the system in which the method and apparatus of the invention may be implemented.

FIG. 2 is a more detailed diagram 200 of a logical configuration of the system in which the method and apparatus of the invention may be implemented. The Environment Copy Tool 210 is illustrated as executing in the cloud 220. In some aspects, the Environment Copy Tool 210 may execute in data center 230 or may be offered as a Software as a Service (SaaS). The Environment Copy Tool 210 may include a virtual memory 211, a virtual Central Processing Unit (CPU) 213, a virtual root device 215, and a virtual NIC 217 that perform operations similar to the corresponding non-virtual components of a computing device. Similarly, source VM 221 includes virtual memory 222, virtual CPU 223, a virtual root device 224, and a virtual Network Interface Card (NIC) 225. An image copy service 227 may execute in the cloud 220 to generate new VMs (e.g., new VM 229). New VM 229, in some aspects, may be a copy of an image of the source VM 221 and may have similar components (not illustrated). The cloud 220 may connect to external networks via virtual network gateway 226.

A storage system 240 may execute in a data center 230. The data center 230 may include a switch 231 (or router) for connecting to external networks (e.g., cloud 220), a domain name server (DNS) 232 for resolving domain name queries, and a storage management server 233 for managing the storage system 240. The data center 230 may be an on-premises data center. The storage system may include a CPU 247 and a memory 242 that is accessed via a fast ethernet interface 241 (or other interface to allow access to the memory 242). Memory 242 may include a storage system operating system 243, a storage replication program 244 (e.g., for generating a secondary volume from a PVOL), a storage management area 245, and a data cache 246. Storage management server 233 may be established in a physical server, a virtual machine, a container, or may be offered as a Software as a Service (SaaS). While FIG. 2 illustrates a hybrid cloud architecture, in some aspects, the copy may be created in another region, for example, a data center and a cloud may be prepared in another region or the copy may be created in a different architecture.

Figure 3:
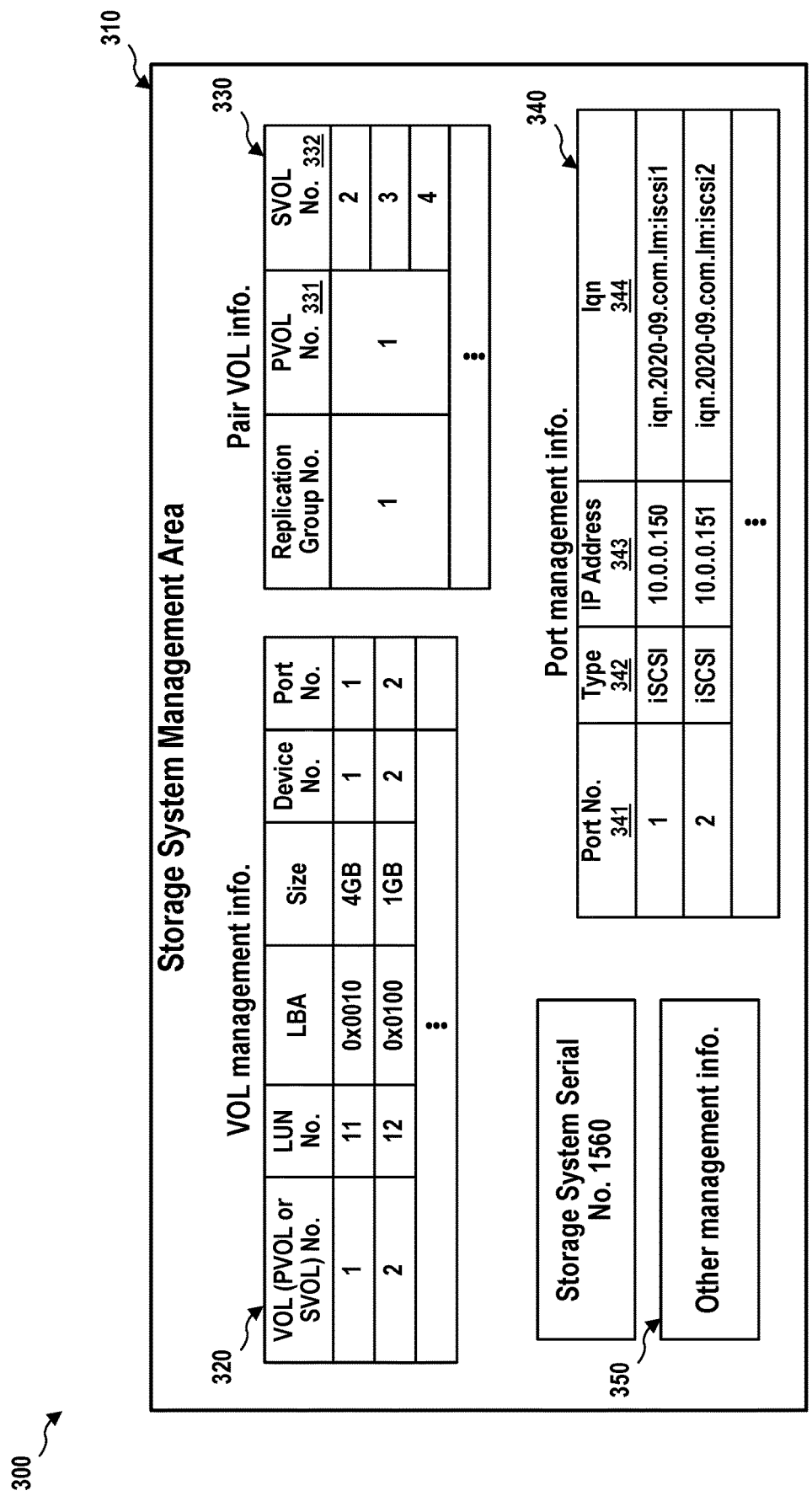
FIG. 3 is a diagram of a storage system management area.

FIG. 3 is a diagram 300 of a storage system management area 310. Storage system management area 310 may include a volume management information (VOL Management info.) table 320 identifying storage volumes. Storage system management area 310 may also include a pair volume information (Pair VOL info.) table 330 that stores information relating primary storage volumes (PVOLs) 331 with associated secondary storage volumes (SVOLs) 332. The pair volume information table 330, in some aspects, is used by the storage system replication function to create replications and manage the relationship between the PVOLs 331 and the SVOLs 332.

The port management information table 340 shows what types of ports the storage system has. For instance, FIG. 3 illustrates the port numbers 341 and port types 342 used to connect the VM in the public cloud and the storage system volumes in an on-premises datacenter. For example, ports 1 and 2 are identified as internet small computer systems interface (iSCSI) ports. The iSCSI ports may also be associated with an IP address 343 and an iSCSI qualified name (iqn) 344. The port type 342 may be fibre channel over ethernet (FCoE), hypertext transfer protocol (HTTP), HTTP secure (HTTPS), and so on, in some aspects. The storage system volumes may be attached to a port in port management information table 340 to be recognize by VMs or servers. While information is illustrated as being stored in tables 320, 330, and 340, other data structures may be used in some aspects. Other management information 350 may, in some aspects, store additional management information, e.g., row device information, pool information, CPU information, etc., to enable storage system management.

Figure 4:
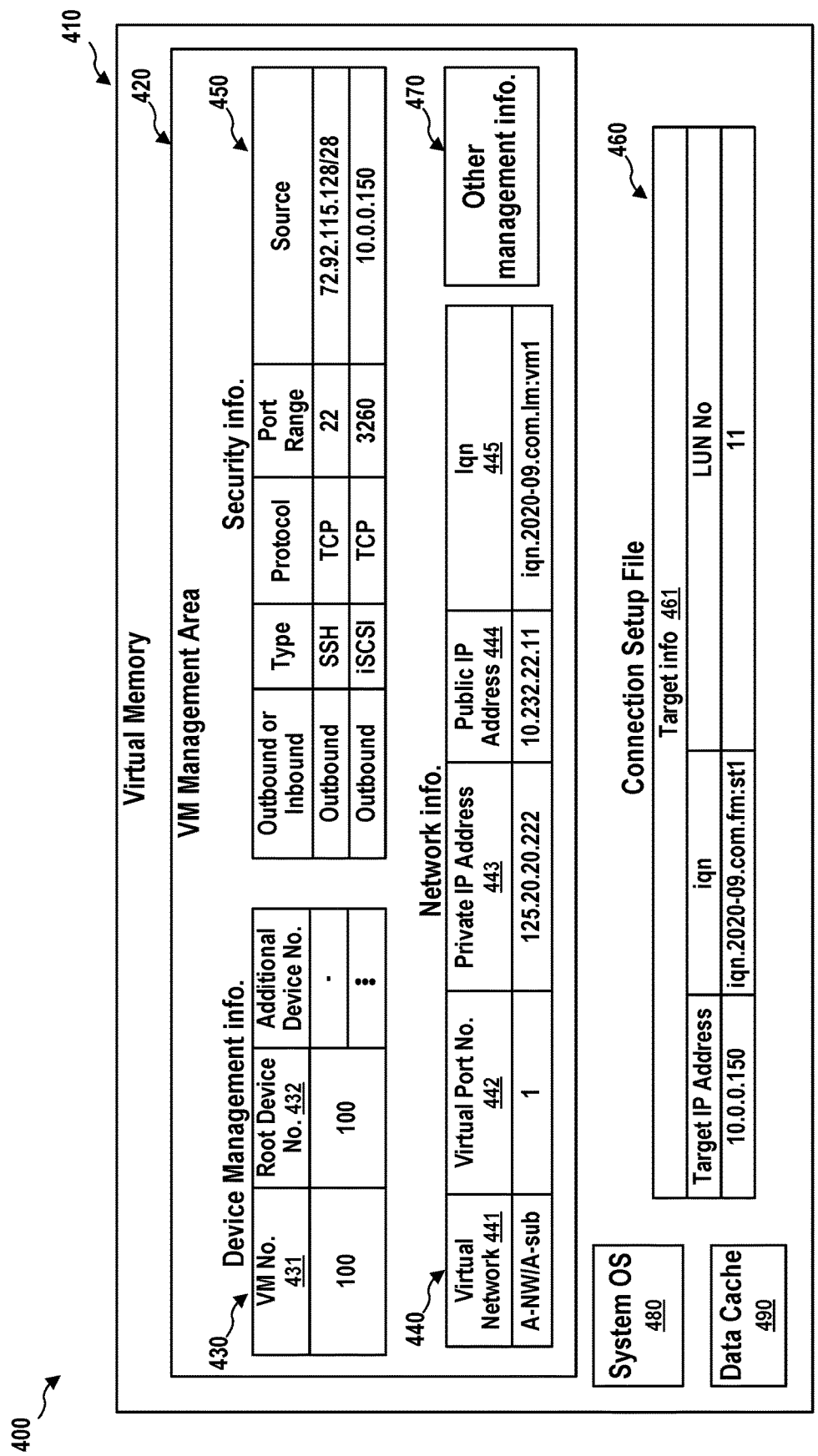
FIG. 4 is a diagram of a virtual memory in a cloud-based VM.

FIG. 4 is a diagram 400 of a virtual memory 410 in a cloud-based VM. virtual memory 410 includes a VM management area 420 storing information for managing the cloud-based VM. Device management information (info.) 430 in VM management area 420 illustrates the VM information such as a VM number 431 and a root device number 432. Additional device numbers indicating the virtual device the cloud service creates and attaches, may be included in device management information. For example, multiple additional devices may be created and attached to a VM in some aspects.

The network information 440 shows the VM's network information. For example, the network information 440 may include a virtual network identifier 441, a virtual port number 442, a private IP address 443, a public IP address 444, and an iqn 445. The network information, in some aspects, is used by the VM to connect to other devices including a storage volume (e.g., a PVOL or SVOL).

The security information 450 shows the protocol access management. The protocols/ports to use as outbound info can be configured by a system administrator. The security information 450 enables control of the protocol access. The connection setup file 460 illustrates target device information 461. This information is referenced to establish the connection between the VM and the storage volume (e.g., a PVOL or SVOL). Other management information 470 may be stored in VM management area 420, while the virtual memory 410 may include a system OS 480 and a data cache 490. The other management information 470 may include information relating to a virtual CPU, virtual network security, etc., that may be used in some aspects to manage the VM and its connection to a storage system.

Figure 5:
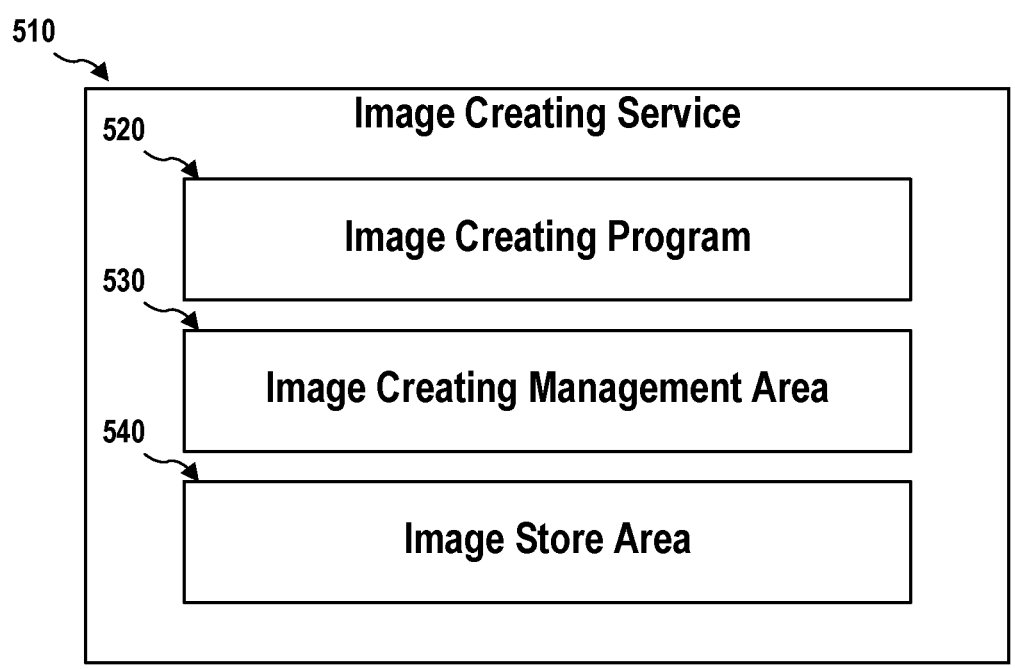
FIG. 5 conceptually illustrates components of an image creating service.

FIG. 5 conceptually illustrates components of an image creating service 510. The image creating service may execute in a public cloud (e.g., in a public cloud hosting VMs that will connect to PVOLs and SVOLs). The image creating service 510 may receive an instruction to create an image of a first VM. Image creating program 520 may create the image of the first VM along with a backup of root devices and/or additional devices. The image may be stored in image store area 540. Image creating management area 530 may then spin up a new VM based on the image of the first VM stored in image store area 540 with new connection parameters to connect to a SVOL. In some aspects, the image creating management area 530 may launch the new VM based on the image with no open connection ports, update the connection setup file and the open port policy, and establish the connection between new VM and an SVOL. For example, the image creating management area 530 may launch, from the image, the copy of the first virtual machine by (1) disabling a set of connection ports for connecting to the primary volume and (2) updating the set of connection ports for connecting to the secondary volume, and (3) enabling the set of connection ports.

Figure 6:
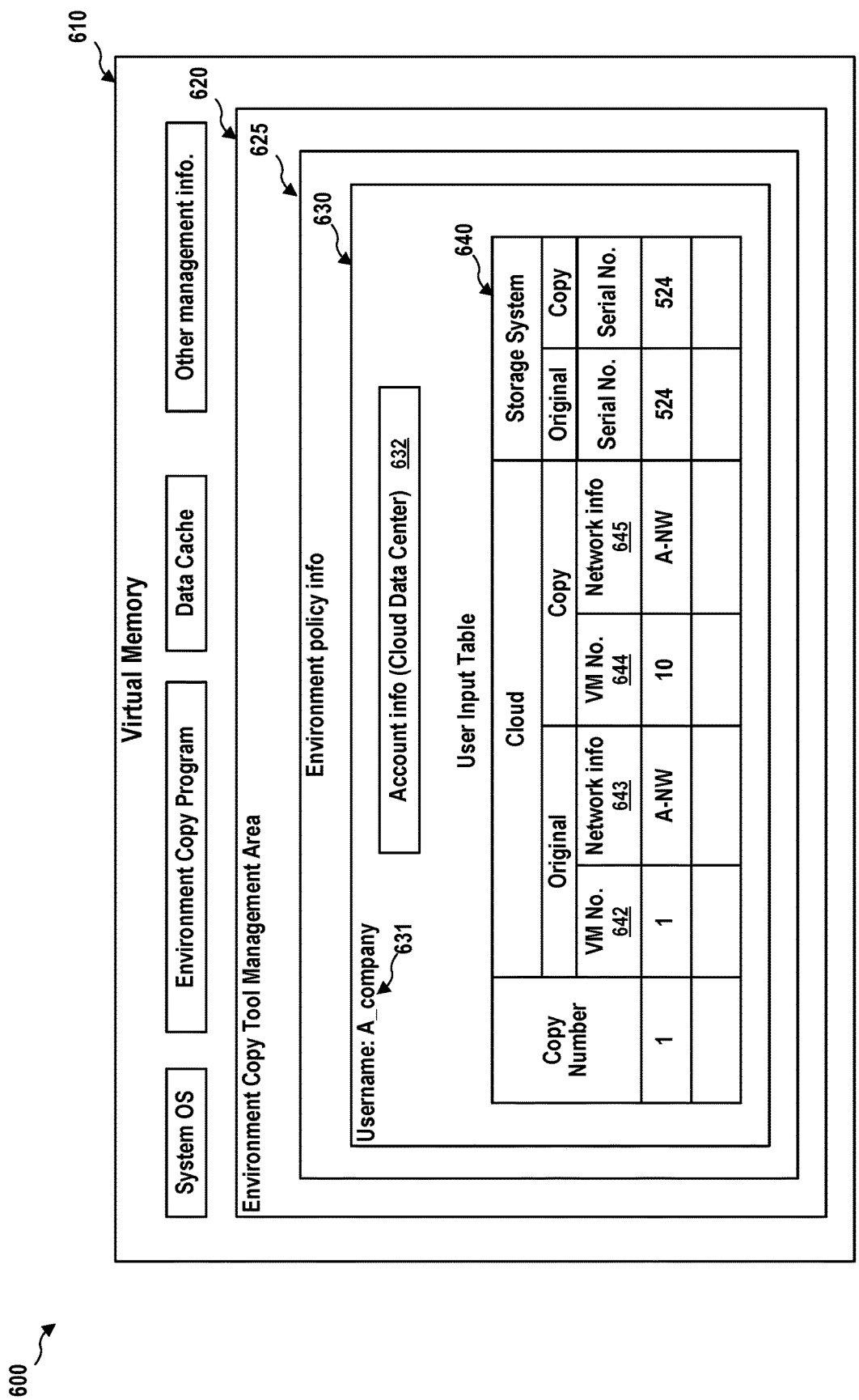
FIG. 6 is a diagram of a virtual memory of an environment copy tool.

FIG. 6 is a diagram 600 of a virtual memory 610 of an environment copy tool (e.g., Environment Copy Tool 110 of FIG. 1). The environment copy tool includes the environmental copy tool management area 620 to manage the environment policy information (info.) 625. A user (e.g., a system administrator) associated with an account 630 may input a policy for creating the new VM (identified by VM number 10 as indicated in VM number field 644 in a user input table 640). Diagram 600 illustrates that the new VM is launched in the same network (e.g., the network A-NW is specified in network information fields 643 and 645 for the original and copy VMs, respectively). In some aspects, the new VM may be launched in a different network or subnetwork. The different network may correspond, in some aspects, to a different region or cloud datacenter. The account information 632 associated with account 630 may be associated with a particular user (e.g., indicated by username 631). The account information 632 may be the account information used to access the cloud and the data center/storage system.

Figure 7:
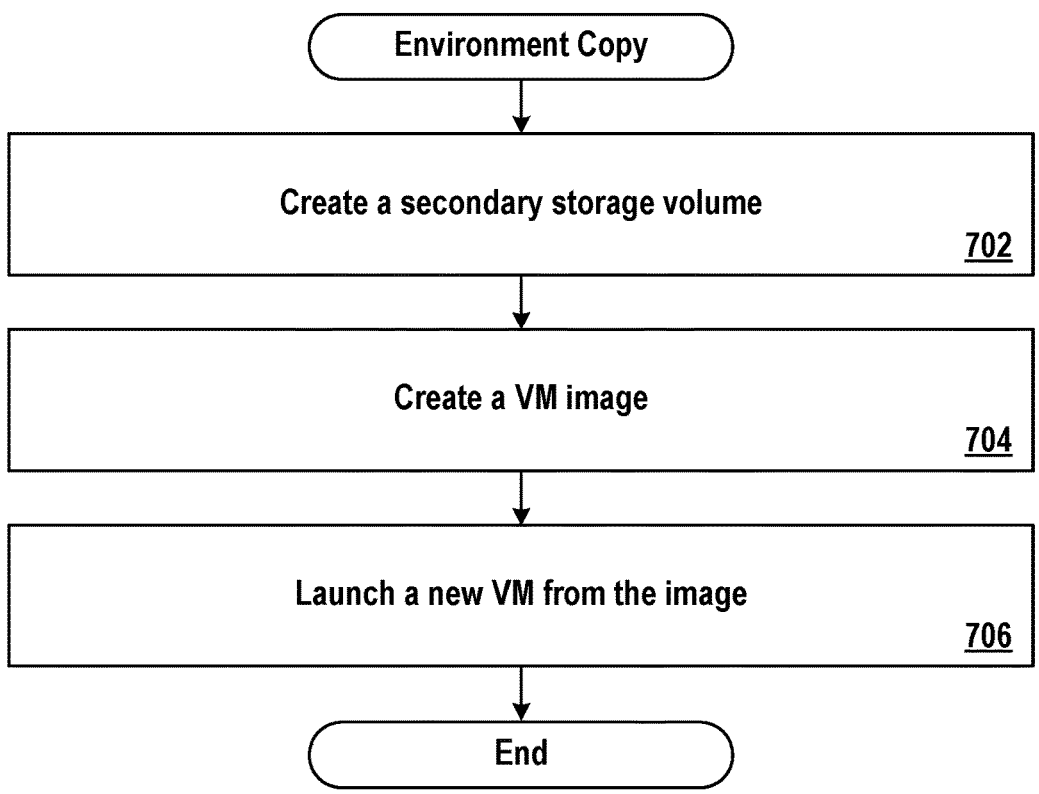
FIG. 7 is a flow diagram of a method of launching a VM according to one aspect of the invention.

FIG. 7 is a flow diagram 700 of a method of launching a VM according to one aspect of the invention. In some aspects the method may be performed by an environment copy tool (e.g., 110 or 210). At 702, the environment copy tool may create a secondary storage volume. Creating a secondary storage volume may include issuing a command to a storage system for the storage system to copy a primary storage volume and create the secondary storage volume. The secondary storage volume may be created based on a copy policy received from a user. The secondary storage volume may be created in a data center (e.g., data center 130 of FIG. 1, or an on-premises data center). In some aspects, creating the secondary storage volume includes updating storage management information with connection port values associated with the secondary volume. For example, referring to FIGS. 1 and 2, environment copy tool 110 (or 210) may instruct storage system 131 (or 240 or storage replication program 244) to generate a secondary storage volume 135.

At 704, the environment copy tool may create a VM image. Creating a VM image may include issuing a command to a cloud-based component to create a VM image. In some aspects, creating the VM image may include copying a set of outbound port information associated with the primary volume. For example, referring to FIG. 2, the environment copy tool 210 may instruct image copy service 227 to create a VM image.

At 706, the environment copy tool may launch the new VM based on the VM image created at 704. Launching the new VM may include updating security information to close connection ports (e.g., disabling a set of connection ports). The new VM may be launched in a private network (e.g., private area 125 of FIG. 1). The closed connection ports may be connection ports associated with connecting the original VM (and the copied VM) to a primary storage volume. The environment copy tool, in some aspects, sets up the security policy to not access the original storage system (primary storage volume). For instance, if the storage volume connects to the VM with an iSCSI protocol, iSCSI protocol (outbound) identified in the security info, the connection port may be disabled. For example, disabling the set of connection ports may include disabling the set of connection ports associated with the set of outbound port information associated with the PVOL. For example, referring to FIG. 4, an outbound port (e.g., iSCSI port associated with port range 3260 and IP address 10.0.0.150) configured to connect to a primary storage volume may be disabled.

The environment copy tool, as part of launching the new VM, may update the connection setup file in the new VM. Updating the connection setup file may be performed after the secondary storage volume is running. For example, updated connection values may be stored after a set of connections for the secondary volume are defined. Updating the connection setup file, in some aspects, may replace target information (e.g., a target IP address, iqn, etc.) associated with a primary storage volume with target information associated with a secondary storage volume (e.g., the stored connection ports for the SVOL). For example, referring to FIG. 4, the environment copy tool may update connection setup file 460 and specifically target information 461 to replace target information associated with a primary storage volume with target information associated with a secondary storage volume.

Launching the new VM, in some aspects, may include the environment copy tool establishing a connection between the new VM and the secondary storage volume. Establishing the connection may include updating the security information in the new volume to open the connection port to connect to the secondary storage volume based on the updated connection information. In some aspects, updating the set of connection ports includes updating, after the copy of the VM is running, the outbound port information associated with the primary volume with outbound port information associated with the secondary volume. Updating the set of connection ports, in some aspects, may occur after a secondary storage volume is running and the connection ports are defined for the secondary storage volume. For example, referring to FIG. 4, an outbound port configured to connect to the secondary storage volume may be enabled.

In some aspects, the environment copy tool may report the copy completion to a user. Launching the VM, including updating the connection setup file and establishing the connection between the new VM and the SVOL may be based on a copy policy. The copy policy may indicate that launching the copy of the first virtual machine comprises (1) disabling the set of connection ports, (2) updating a set of connection port values associated with the set of connection ports to a stored set of connection port values used to connect to the secondary volume, and (3) enabling the updated set of connection ports. Updated connection port values may be stored after a set of connection ports for the secondary volume are defined.

Figure 8:
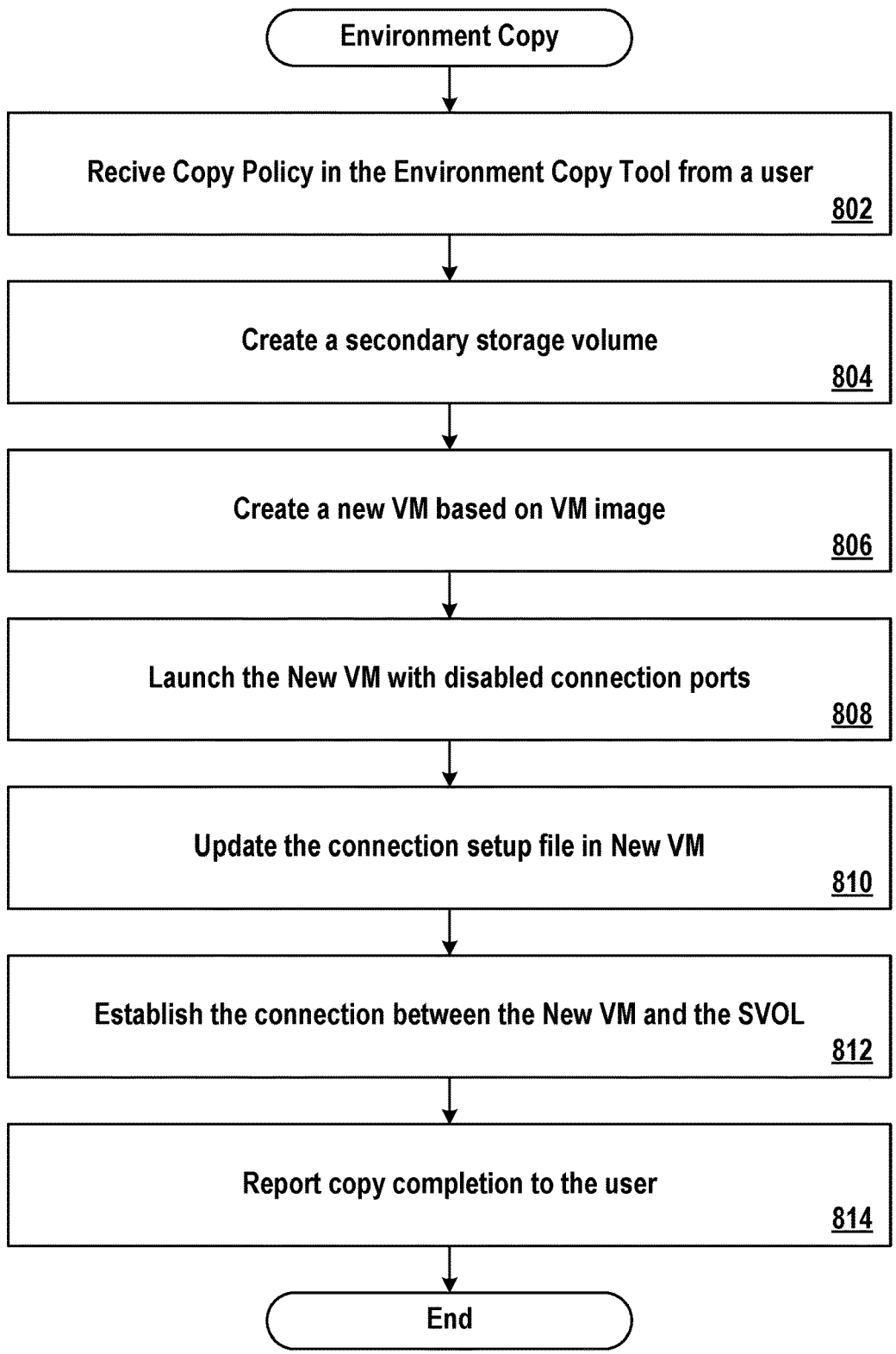
FIG. 8 is a flow diagram of a method of launching a VM according to one aspect of the invention.

FIG. 8 is a flow diagram 800 of a method of launching a VM according to one aspect of the invention. In some aspects the method may be performed by an environment copy tool (e.g., 110 or 210). At 802 the environment copy tool may receive a copy policy from a user (e.g., a system administrator, etc.). As illustrated in FIG. 6, the copy policy may indicate a VM to copy (identified by VM number 642), a source network information field 643, a destination network information field 645, and a storage volume to access.

At 804, the environment copy tool may create a secondary storage volume. Creating a secondary storage volume may include issuing a command to a storage system for the storage system to copy a primary storage volume and create the secondary storage volume. The secondary storage volume may be created in a data center (e.g., data center 130 of FIG. 1, or an on-premises data center). In some aspects, creating the secondary storage volume includes updating storage management information with connection port values associated with the secondary volume. For example, referring to FIGS. 1 and 2, environment copy tool 110 (or 210) may instruct storage system 131 (or 240 or storage replication program 244) to generate a secondary storage volume 135.

At 806, the environment copy tool may create a new VM based on a VM image. Creating a new VM may include issuing a command to a cloud-based component to create a new VM. In some aspects, creating the VM image may include copying a set of outbound port information associated with the primary volume. For example, referring to FIG. 2, the environment copy tool 210 may instruct image copy service 227 to create new VM 229.

At 808, the environment copy tool may launch the new VM created at 806. Launching the new VM may include updating security information to close connection ports (e.g., disabling a set of connection ports). The new VM may be launched in a private network (e.g., private area 125 of FIG. 1). The closed connection ports may be connection ports associated with connecting the original VM (and the copied VM) to a primary storage volume. The environment copy tool, in some aspects, sets up the security policy to not access the original storage system (primary storage volume). For instance, if the storage volume connects to the VM with an iSCSI protocol, iSCSI protocol (outbound) identified in the security info, the connection port may be disabled. For example, disabling the set of connection ports may include disabling the set of connection ports associated with the set of outbound port information associated with the PVOL. For example, referring to FIG. 4, an outbound port (e.g., iSCSI port associated with port range 3260 and IP address 10.0.0.150) configured to connect to a primary storage volume may be disabled.

At 810, the environment copy tool may update the connection setup file in the new VM. Updating the connection setup file, at 810, may be performed after the secondary storage volume is running. For example, updated connection values may be stored after a set of connections for the secondary volume are defined. Updating the connection setup file, in some aspects, may replace target information (e.g., a target IP address, iqn, etc.) associated with a primary storage volume with target information associated with a secondary storage volume (e.g., the stored connection ports for the SVOL). For example, referring to FIG. 4, the environment copy tool may update connection setup file 460 and specifically target information 461 to replace target information associated with a primary storage volume with target information associated with a secondary storage volume.

At 812, the environment copy tool may establish a connection between the new VM and the secondary storage volume. Establishing the connection, at 812, may include updating the security information in the new volume to open the connection port to connect to the secondary storage volume based on the connection information updated at 810. In some aspects, updating the set of connection ports includes updating, after the copy of the VM is running, the outbound port information associated with the primary volume with outbound port information associated with the secondary volume. Updating the set of connection ports, in some aspects, may occur after a secondary storage volume is running and the connection ports are defined for the secondary storage volume. For example, referring to FIG. 4, an outbound port configured to connect to the secondary storage volume may be enabled.

Finally, at 814, the environment copy tool may report the copy completion to a user. Launching the VM (at 808), updating the connection setup file (at 810), and establishing the connection between the new VM and the SVOL (at 812) may be based on a copy policy. The copy policy may indicate that launching the copy of the first virtual machine comprises (1) disabling the set of connection ports, (2) updating a set of connection port values associated with the set of connection ports to a stored set of connection port values used to connect to the secondary volume, and (3) enabling the updated set of connection ports. Updated connection port values may be stored after a set of connection ports for the secondary volume are defined.

Figure 9:
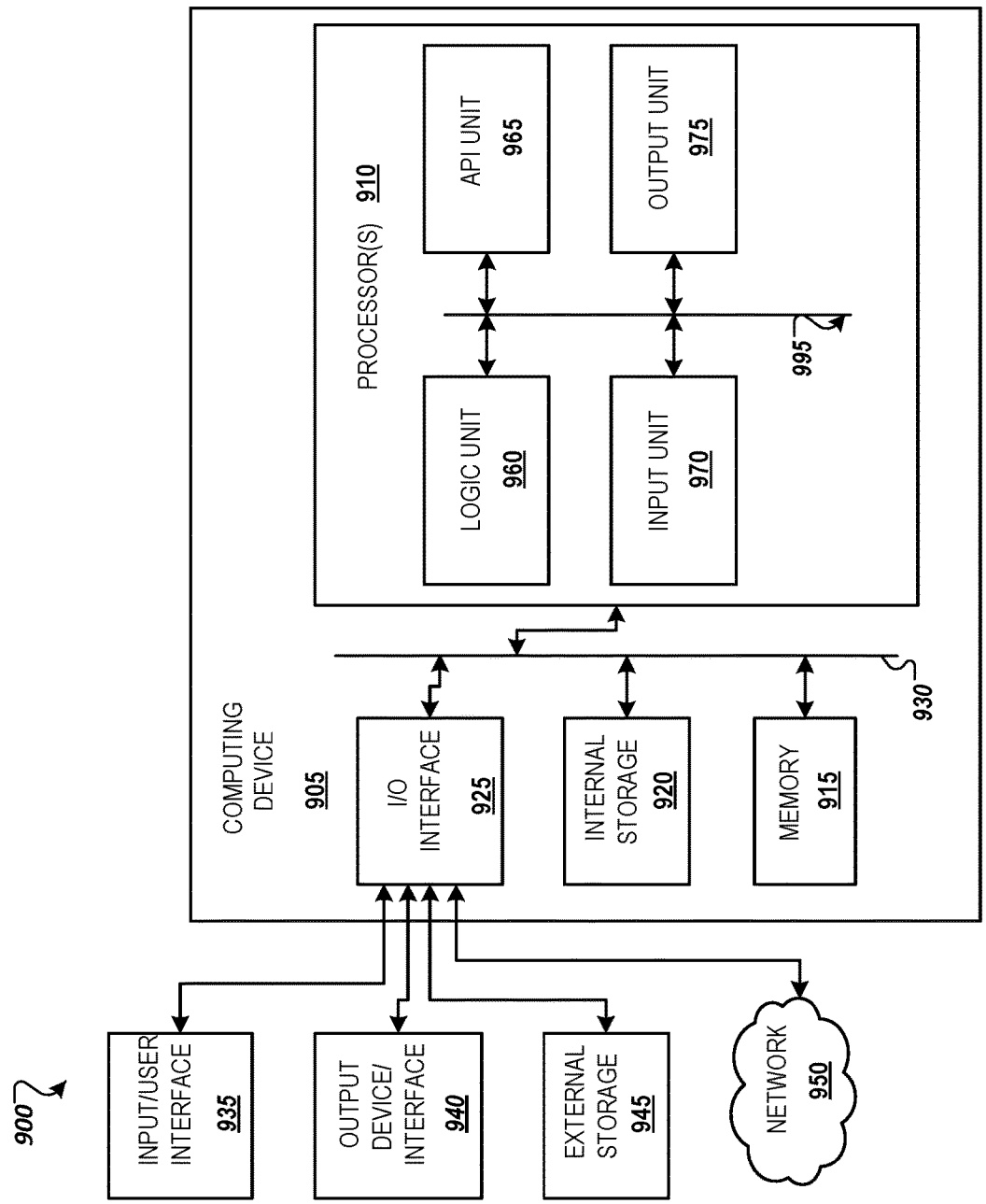
FIG. 9 illustrates an example computing environment with an example computer device suitable for use in some example implementations.

FIG. 9 illustrates an example computing environment with an example computer device suitable for use in some example implementations. Computer device 905 in computing environment 900 can include one or more processing units, cores, or processors 910, memory 915 (e.g., RAM, ROM, and/or the like), internal storage 920 (e.g., magnetic, optical, solid-state storage, and/or organic), and/or IO interface 925, any of which can be coupled on a communication mechanism or bus 930 for communicating information or embedded in the computer device 905. IO interface 925 is also configured to receive images from cameras or provide images to projectors or displays, depending on the desired implementation.

Computer device 905 can be communicatively coupled to input/user interface 935 and output device/interface 940. Either one or both of the input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

IO interface 925 can include but is not limited to, wired and/or wireless interfaces using any communication or IO protocols or standards (e.g., Ethernet, 902.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, the input unit 970, the output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide an output based on the calculations described in example implementations.

Processor(s) 910 can be configured to create a secondary volume. The processor(s) 910 may also be configured to create an image of a first virtual machine. The processor(s) 910 may further be configured to create a new VM based on a VM image. The processor(s) 910 may further be configured to launch, from the image, a copy of the first virtual machine by (1) disabling a set of connection ports for connecting to a primary volume, (2) updating the set of connection ports for connecting to the secondary volume, and (3) enabling the set of connection ports. The processor(s) 910 may also be configured to receive a copy policy from a user. The processor(s) 910 may also be configured to update the connection setup file in the new VM. The processor(s) 910 may further be configured to establish a connection between the new VM and the secondary storage volume. The processor(s) 910 may also be configured to report the copy completion to a user. The processor(s) 910 may further be configured to create the image by copying a set of outbound port information associated with the primary volume. The processor(s) 910 may also be configured to disable the set of connection ports by disabling the set of connection ports associated with the set of outbound port information. The processor(s) 910 may further be configured to update the set of connection ports by updating, after the copy of the first virtual machine is running, the outbound port information associated with the primary volume with outbound port information associated with the secondary volume.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as, but not limited to optical disks, magnetic disks, read-only memories, random access memories, solid-state devices, and drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed:

1. A method, for copying a first virtual machine accessing a primary volume in a hybrid cloud environment, the copy of the first virtual machine accessing a secondary volume in the hybrid cloud environment, the method comprising:
   creating the secondary volume;
   creating an image of the first virtual machine; and
   launching, from the image, the copy of the first virtual machine by (1) disabling a set of connection ports for connecting to the primary volume and (2) updating the set of connection ports for connecting to the secondary volume, and (3) enabling the set of connection ports.

2. The method of claim 1, wherein the copy of the first virtual machine is launched in a private network.

3. The method of claim 2, wherein the secondary volume is created in a data center.

4. The method of claim 1, wherein launching the copy of the first virtual machine is based on a copy policy, the copy policy indicating that launching the copy of the first virtual machine comprises (1) disabling the set of connection ports, (2) updating a set of connection port values associated with the set of connection ports to a stored set of connection port values used to connect to the secondary volume, and (3) enabling the updated set of connection ports.

5. The method of claim 4, wherein the updated connection port values are stored after a set of connection ports for the secondary volume are defined.

6. The method of claim 1, wherein creating the secondary volume comprises updating storage management information with connection port values associated with the secondary volume.

7. The method of claim 1, wherein:
creating the image comprises copying a set of outbound port information associated with the primary volume,
disabling the set of connection ports comprises disabling the set of connection ports associated with the set of outbound port information, and
updating the set of connection ports comprises updating, after the copy of the first virtual machine is running, the outbound port information associated with the primary volume with outbound port information associated with the secondary volume.

8. The method of claim 1, further comprising establishing a connection between the copy of the first virtual machine and the secondary volume.

9. A non-transitory computer-readable medium storing computer executable code for copying a first virtual machine accessing a primary volume in a hybrid cloud environment, the copy of the first virtual machine accessing a secondary volume in the hybrid cloud environment, the code when executed by a processor causes the processor to:
create the secondary volume;
create an image of the first virtual machine; and
launch, from the image, the copy of the first virtual machine by (1) disabling a set of connection ports for connecting to the primary volume and (2) updating the set of connection ports for connecting to the secondary volume, and (3) enabling the set of connection ports.

10. The non-transitory computer-readable medium of claim 9, wherein the copy of the first virtual machine is launched in a private network.

11. The non-transitory computer-readable medium of claim 10, wherein the secondary volume is created in a data center.

12. The non-transitory computer-readable medium of claim 9, wherein launching the copy of the first virtual machine is based on a copy policy, the copy policy indicating that launching the copy of the first virtual machine comprises (1) disabling the set of connection ports, (2) updating a set of connection port values associated with the set of connection ports to a stored set of connection port values used to connect to the secondary volume, and (3) enabling the updated set of connection ports.

13. The non-transitory computer-readable medium of claim 9, wherein:
creating the image comprises copying a set of outbound port information associated with the primary volume,
disabling the set of connection ports comprises disabling the set of connection ports associated with the set of outbound port information, and
updating the set of connection ports comprises updating, after the copy of the first virtual machine is running, the outbound port information associated with the primary volume with outbound port information associated with the secondary volume.

14. The non-transitory computer-readable medium of claim 9, further storing computer executable code that, when executed by the processor, causes the processor to establish a connection between the copy of the first virtual machine and the secondary volume.

15. A management server for copying a first virtual machine accessing a primary volume in a hybrid cloud environment, the copy of the first virtual machine accessing a secondary volume in the hybrid cloud environment, the management server comprising:
a computer-readable medium storing computer executable code; and
a processor, wherein the processor executes the code to:
create the secondary volume;
create an image of the first virtual machine; and
launch, from the image, the copy of the first virtual machine by (1) disabling a set of connection ports for connecting to the primary volume and (2) updating the set of connection ports for connecting to the secondary volume, and (3) enabling the set of connection ports.

16. The management server of claim 15, wherein launching the copy of the first virtual machine is based on a copy policy, the copy policy indicating that launching the copy of the first virtual machine comprises (1) disabling the set of connection ports, (2) updating a set of connection port values associated with the set of connection ports to a stored set of connection port values used to connect to the secondary volume, and (3) enabling the updated set of connection ports.

17. The management server of claim 16, wherein the updated connection port values are stored after a set of connection ports for the secondary volume are defined.

18. The management server of claim 15, wherein creating the secondary volume comprises updating storage management information with connection port values associated with the secondary volume.

19. The management server of claim 15, wherein:
creating the image comprises copying a set of outbound port information associated with the primary volume,
disabling the set of connection ports comprises disabling the set of connection ports associated with the set of outbound port information, and
updating the set of connection ports comprises updating, after the copy of the first virtual machine is running, the outbound port information associated with the primary volume with outbound port information associated with the secondary volume.

20. The management server of claim 15, the computer-readable medium further storing computer executable code that, when executed by the processor, causes the processor to establish a connection between the copy of the first virtual machine and the secondary volume.

* * * * *